United States Patent
Wang et al.

(10) Patent No.: US 10,733,791 B2
(45) Date of Patent: Aug. 4, 2020

(54) REAL-TIME RENDERING METHOD BASED ON ENERGY CONSUMPTION-ERROR PRECOMPUTATION

(71) Applicant: ZHEJIANG UNIVERSITY, Hangzhou, Zhejiang Province (CN)

(72) Inventors: Rui Wang, Hangzhou (CN); Hujun Bao, Hangzhou (CN); Tianlei Hu, Hangzhou (CN); Bowen Yu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 16/097,529

(22) PCT Filed: Apr. 18, 2017

(86) PCT No.: PCT/CN2017/080859
§ 371 (c)(1),
(2) Date: Oct. 29, 2018

(87) PCT Pub. No.: WO2017/186019
PCT Pub. Date: Nov. 2, 2017

(65) Prior Publication Data
US 2019/0147641 A1 May 16, 2019

(30) Foreign Application Priority Data

Apr. 28, 2016 (CN) .......................... 2016 1 0278727

(51) Int. Cl.
*G06T 15/20* (2011.01)
*G06T 1/20* (2006.01)
*G06T 15/00* (2011.01)

(52) U.S. Cl.
CPC ................ *G06T 15/20* (2013.01); *G06T 1/20* (2013.01); *G06T 15/005* (2013.01)

(58) Field of Classification Search
None
See application file for complete search history.

(56) References Cited

U.S. PATENT DOCUMENTS

2005/0110789 A1  5/2005  Le Ouay

FOREIGN PATENT DOCUMENTS

| CN | 101183276 | 5/2008 |
| CN | 101369345 | 2/2009 |
| CN | 102622776 | 8/2012 |

OTHER PUBLICATIONS

Rui Wang, Bowen Yu, Julio Marco, Tianlei Hu, Diego Gutierrez, Hujun Bao, "Real-time Rendering on a Power Budget", Jul. 2016, ACM, ACM Transactions on Graphics (TOG) TOG, vol. 35 Issue 4, Article No. 11.*
Efstathios Stavrakis, Marios Polychronis, Nectarios Pelekanos, Alessandro Artusi, Panayiotis Hadjichristodoulou,Yiorgos Chrysanthou, "Toward Energy-Aware Balancing of Mobile Graphics", Mar. 11, 2015, SPIE, Proc. SPIE 9411, Mobile Devices and Multimedia: Enabling Technologies, Algorithms, and Applications 2015.*
Oliver Mattausch, "Visibility Algorithms for Real-Time Rendering in General 3D Environments", Feb. 11, 2010, Dissertation, Vienna University of Technology.*
Chen-Wei Huang, Yu-An Chung, Pei-Shu Huang, Shiao-Li Tsao, "High-Level Energy Consumption Model of Embedded Graphic Processors", Jul. 24, 2015, IEEE, 2015 IEEE International Conference on Digital Signal Processing (DSP), pp. 105-109.*

* cited by examiner

*Primary Examiner* — Robert Bader
(74) *Attorney, Agent, or Firm* — Jiwen Chen

(57) ABSTRACT

The invention discloses a real-time rendering method based on energy consumption-error precomputation, comprising: determining the spatial level structure of the scene to be rendered through adaptive subdivision of the space positions and look space of the camera browsable to the user in the 3D scene to be rendered; during the process of adaptive subdivision of the space, for each position subspace obtained at the completion of each subdivision, obtaining the error and energy consumption of the camera for rendering the 3D scene using a plurality of sets of preset rendering parameters in each look subspace at each vertex of the bounding volume that bounds the position subspace, and Pareto curve of the corresponding vertex and look subspace is built based on the error and energy consumption; based on the current camera viewpoint information, searching and obtaining the target Pareto curve in the spatial level structure to determine a set of rendering parameters satisfying the precomputation condition as optimum rendering parameters to perform rendering. The present invention not only saves a great deal of energy, but also ensures the quality of rendering result and extends the battery life.

12 Claims, No Drawings

REAL-TIME RENDERING METHOD BASED ON ENERGY CONSUMPTION-ERROR PRECOMPUTATION

This is a U.S. national stage application of PCT Application No. PCT/CN2017/080859 under 35 U.S.C. 371, filed Apr. 18, 2017 in Chinese, claiming priority of Chinese Application No. 201610278727.5, filed Apr. 28, 2016, all of which are hereby incorporated by reference.

TECHNICAL FIELD

The present invention relates to the image technology field, especially relates to an optimum real-time rendering framework based on energy consumption or error precomputation.

BACKGROUND ART

Rendering is the process of converting a 3D (three dimensional) geometric model into a graphic image. The rendering of an animation scene is a highly time-consuming process, because one animation generally consists of tens of thousands of frames. As the demand for visual effect is getting higher and higher, the resolution of each frame is also getting higher and higher, the number of pixels is getting higher and higher, it may take hours to complete the rendering of a picture.

As the modern graphic hardware acceleration technology progresses, the high speed development of GPU (graphics processing unit) has greatly improved the speed and quality of computer graphic processing, advancing the rapid development of application fields related to computer graphics. Meanwhile, the high speed and parallelism of a GPU rendering pipeline has provided a good platform for a general purpose GPU computation.

In recent years, as the popularization of GPU on battery-powered mobile devices, many Apps that require real-time rendering technology have emerged on such devices. Computation required by such Apps can quickly consume the battery power, on one hand, it is adverse to the life cycle of the battery, more importantly, it reduces the standby time of the mobile device, causing limitation to the user of the device.

Under this background, rendering under the energy consumption precomputation has become an actual demand. Reducing the energy consumption demand of the rendering-related Apps is one of the challenges facing the future computer graphics field. However, currently, there is not a universal solution, and there is much potential in this field that is not explored yet. In the strategy of reducing the energy consumption demand of the graphic App running on battery-powered device, to reduce the computation load in the graphic rendering pipeline is proved to be an effective solution. However, the scope of application of most existing solutions is limited, they are generally applicable to a certain specific App only.

Besides, most methods in the prior art realize the purpose of optimizing resources and reducing energy consumption based on specific graphic pipeline design and hardware. Due to that they are realized through base hardware, the existing hardware structure of the device needs to be changed at high cost.

Some other methods reduce the energy consumption through adaptive device brightness tuning. However, this cannot ensure the image quality, and doesn't actually solve the problem.

SUMMARY OF THE INVENTION

In consideration of the shortcomings of the prior art, the present invention proposes a real-time rendering method based on energy consumption-error precomputation to find the optimum rendering parameter under the precondition of satisfying the precomputation condition, which can greatly reduce the energy consumption demand during the rendering process and extend the battery life while ensuring the image quality, or reduce the rendering error while ensuring energy consumption demand.

A real-time rendering method based on energy consumption-error precomputation, comprising the following steps:

(1) A plurality of position subspaces and look subspaces with spatial level relationship are obtained through adaptive subdivision of the space positions and look space of the camera browsable to the user in the 3D scene to be rendered, and the spatial level structure of the scene to be rendered is determined based on the spatial level relationship between the position subspaces and the look subspaces;

During the process of adaptive subdivision of the camera position space, for each position subspace obtained at the completion of each subdivision, obtaining the error and energy consumption of the camera for rendering the 3D scene using a plurality of sets of preset rendering parameters in each look subspace at each vertex of the bounding volume that bounds the position subspace, and Pareto curve of the corresponding vertex and look subspace is built based on the error and energy consumption;

(2) Based on the current camera viewpoint information, searching and obtaining the target Pareto curve in the spatial level structure, and use the target Pareto curve to determine a set of rendering parameters satisfying the precomputation condition as optimum rendering parameters to render the 3D scene to be rendered;

The viewpoint information comprises the position and orientation of the camera, and the precomputation condition is energy consumption precomputation or error precomputation.

The Pareto curve of the present invention is energy consumption-error Pareto curve, which corresponds a plurality of sets of optimum energy consumption-error rendering parameters, the optimum energy consumption-error rendering parameter is the optimum Pareto curve of the energy consumption and error obtained from using such rendering parameters in the space formed by the energy consumption and error obtained from using other rendering parameters.

Each set of rendering parameters in the invention comprises at least the value of one rendering variable that controls the real-time rendering quality. When the number of the rendering variables corresponding to the rendering parameter exceeds 1, a set of rendering parameters can be represented by vector.

In the present invention, when obtaining the error and energy consumption when the camera renders the 3D scene to be rendered using a plurality of sets of preset rendering parameters in each look subspace at each vertex point of the bounding volume that bounds the position subspace, the image quality relationship corresponding to such a plurality of rendering parameters is fixed. The more the sets of rendering parameters are used, the more accurate the finally obtained rendering parameter will be, however, it will take much more time, therefore, it shall be set based on actual application needs.

In the present invention, the energy consumption corresponding to each set of rendering parameters is the energy required for rendering the scene to be rendered using that set of rendering parameters.

Further preferably, the error corresponding to each set of rendering parameters is the difference between the image obtained from rendering the 3D scene to be rendered using that set of rendering parameters and the image obtained from rendering the 3D scene to be rendered using the top quality rendering parameters;

The high-low quality relationship of the rendered images obtained from a plurality of sets of preset rendering parameters is known already, just directly selecting the set of rendering parameters of the highest rendering image quality as the top quality rendering parameters.

At the time of adaptive subdivision of the position space and look space of the camera browsable to user in the 3D scene to be rendered, subdividing the space position first to obtain corresponding position subspaces, then at each of the vertex point of the bounding volume that bounds the position subspace, subdividing the look space of the camera at the vertex browsable to user to obtain corresponding look subspaces.

Preferably, corresponding look subspaces are obtained by subdividing the look space of the camera browsable to user at each vertex point by direction.

Further preferably, dividing by six directions, and when dividing, building a 3D rectangular coordinate system at the vertex point, then dividing based on the positive and negative directions of the coordinate axes in the 3D rectangular coordinate system.

In the process of adaptive subdivision of the position space and look space of the camera browsable to user in the 3D scene to be rendered, prior to each subdividing, in respect of the current position subspace to be subdivided, conduct operation as follows based on the Pareto curve at each of the vertex point of the bounding volume that bounds that position subspace:

(a) If both of the two Pareto curves in each look space corresponding to the two vertexes at all sides of the bounding volume that bounds the current position subspace satisfy the condition of convergence, then stopping subdividing of the position subspace; the condition of convergence means the energy consumption distance between the two Pareto curves is less than the energy threshold or the error distance is less than the distance threshold;

(b) Otherwise, continuing subdividing that position subspace.

Preferably, the energy consumption threshold is 0.5, the error threshold is 0.005, so as to ensure that the finally obtained result can reach the minimum energy consumption under the precondition of ensuring the image quality. In actual application, the energy consumption threshold and the error threshold can also be set based on application needs.

The definitions of the energy consumption distance and error distance between the two Pareto curves $P_{c_0}$, $P_{c_1}$ are as follow:

$$D_e(P_{c_0}, P_{c_1}) = d_e(P_{c_0}, P_{c_1}) + d_e(P_{c_1}, P_{c_0}),$$

$$D_p(P_{c_0}, P_{c_1}) = d_p(P_{c_0}, P_{c_1}) + d_p(P_{c_1}, P_{c_0}),$$

Where, $c_0$ and $c_1$ respectively represent the viewpoint information of the camera corresponding to Pareto curves $P_{c_0}$, $P_{c_1}$, $D_e(P_{c_0}, P_{c_1})$ is the error distance between Pareto curves $P_{c_0}$, $P_{c_1}$, $D_p(P_{c_0}, P_{c_1})$ is the energy consumption distance between Pareto curves $P_{c_0}$, $P_{c_1}$, $d_e(P_{c_1}, P_{c_0})$ is the error semi distance function from Pareto curve $P_{c_1}$ to Pareto curve $P_{c_0}$, $d_e(P_{c_0}, P_{c_1})$ is the error semi distance function from Pareto curve $P_{c_0}$ to Pareto curve $P_{c_1}$, $d_p(P_{c_1}, P_{c_0})$ is the energy consumption semi distance function from Pareto curve $P_{c_1}$ to Pareto curve $P_{c_0}$, $D_p(P_{c_0}, P_{c_1})$ is semi distance function of energy consumption from Pareto curve $P_{c_0}$ to $P_{c_1}$, Which are respectively calculated using the formulas below:

$$d_e(P_{c_0}, P_{c_1}) = \frac{1}{N}\Sigma_j^N d_e(s_{0j}, P_{c_1}) = \frac{1}{N}\Sigma_j^N |e_{s_{0j}} - e'_{s_{0j}}|,$$

$$d_p(P_{c_0}, P_{c_1}) = \frac{1}{N}\Sigma_j^N d_p(s_{0j}, P_{c_1}) = \frac{1}{N}\Sigma_j^N |p_{s_{0j}} - p'_{s_{0j}}|;$$

$$d_e(P_{c_1}, P_{c_0}) = \frac{1}{M}\Sigma_j^N d_e(s_{1j}, P_{c_0}) = \frac{1}{M}\Sigma_j^N |e_{s_{1j}} - e'_{s_{1j}}|,$$

$$d_p(P_{c_1}, P_{c_0}) = \frac{1}{M}\Sigma_j^N d_p(s_{1j}, P_{c_0}) = \frac{1}{M}\Sigma_j^N |p_{s_{1j}} - p'_{s_{1j}}|;$$

Wherein, $c_0$ and $c_1$ respectively represent the camera viewpoint information corresponding to Pareto curves $P_{c_0}$, $P_{c_1}$, the camera viewpoint information is determined by the current position and orientation of the camera; N is the number of the rendering parameters on Pareto curve $P_{c_0}$, $s_{0j}$ is parameter j on Pareto curve $P_{c_0}$, $e_{s_{0j}}'$ is the error when the camera viewpoint information is $c_0$ and the rendering parameter is set to $s_{0j}$, $e_{s_{0j}}'$ is the error when the camera viewpoint information is $c_1$ and the rendering parameter is set to $s_{0j}$, $d_e(s_{0j}, P_{c_1})$ is the difference between the error when the camera viewpoint information is $c_0$ and the rendering parameter is set to $s_{0j}$ and the error when the camera viewpoint information is $c_1$ and the rendering parameter is set to $s_{0j}$; $p_{s_{0j}}$ is the energy consumption when the camera viewpoint information is $c_1$ and the rendering parameter is set to $s_{0j}$, $e_{s_{0j}}'$ is the energy consumption when the camera viewpoint information is $c_1$ and the rendering parameter is set to $s_{0j}$, $d_p(s_{0j}, P_{c_1})$ is the difference between the energy consumption when the camera viewpoint information is $c_1$ and the rendering parameter is set to $s_{0j}$ and the energy consumption when the camera viewpoint information is $c_0$ and the rendering parameter is set to $s_{0j}$;

M is the number of the rendering parameters on Pareto curve $P_{c_1}$, $s_{1j}$ is parameter j on Pareto curve $P_{c_1}$, $e_{s_{1j}}$ is the error when the camera viewpoint information is $c_1$ and the rendering parameter is set to $s_{1j}$, $e_{s_{1j}}'$ is the error when the camera viewpoint information is $c_0$ and the rendering parameter is set to $s_{1j}$, $d_e(s_{1j}, P_{c_0})$ is the difference between the error when the camera viewpoint information is $c_1$ and the rendering parameter is set to $s_{1j}$ and the error when the camera viewpoint information is $c_0$ and the rendering parameter is set to $s_{1j}$; $p_{s_{1j}}$ is the energy consumption when the camera viewpoint information is $c_1$ and the rendering parameter is set to $s_{1j}$, $p_{s_{1j}}'$ is the energy consumption when the camera viewpoint information is $c_0$ and the rendering parameter is set to $s_{1j}$, $d_p(s_{1j}, P_{c_0})$ is the difference between the energy consumption when the camera viewpoint information is $c_1$ and the rendering parameter is set to $s_{1j}$ and the energy consumption when the camera viewpoint information is $c_0$ and the rendering parameter is set to $s_{1j}$.

In respect of the position subspace obtained from each subdivision, the Pareto curve on each look subspace at each vertex point of the bounding volume that bounds the position subspace is calculated as follows:

If the vertex is the vertex of the bounding volume that bounds the position subspace obtained from subdividing the upper level, then it is not to be calculated;

If it is on the side on which the two vertexes of the side on which that vertex is located satisfy the condition of convergence on the bounding volume that bounds the position subspace obtained from subdividing the upper level, then select the Pareto curve of any of the two vertexes on that side as the Pareto curve of the vertex;

Otherwise the Pareto curve of the vertex is to be calculated.

In order to efficiently obtain each Pareto curve, preferably, calculating the Pareto curve of the vertex based on genetic algorithm specifically as follows:

First, randomly initializing a plurality of rendering parameter vectors to build initial parameters set, then operating as follows through iteration until the maximum times of iteration is reached, and building Pareto curve per the rendering parameter vector in the parameters set obtained from the last iteration:

Propagating and mutating the rendering parameter vector in the initial parameters set to generate new rendering parameter vector to form candidate set;

For the combination u and u' of any two parameters in the candidate set, if it satisfies u ≮ u', then keep it, otherwise getting rid of u', and end the iteration, and using the combination obtained from that iteration as initial set for next iteration, u ≮ u' means (e(c,u')≤e(c,u) or p(c,u')<p(c,u)) and (p(c,u')≤p(c,u) or e(c,u')<e(c,u)), where, c is the viewpoint information, e(c,s) means the error of rendering when the camera viewpoint information is c and the rendering parameter vector is s, p(c,s) is the energy consumption of rendering when the camera viewpoint information is c and the rendering parameter vector is s.

Preferably, the maximum iteration times are the mean value of the number of all allowed values of the rendering variable in the rendering parameter.

The method for searching and obtaining the target Pareto curve in the spatial level structure based on the current camera position and orientation is as follows:

Searching the spatial level structure based on the current camera viewpoint information, obtaining the position subspace in which the camera position is and the vertex on the bounding volume that bounds the position subspace that is closest to that position, and determining the look subspace in which the current camera orientation is located from the look subspace of the closest vertex of the bounding volume that bounds the position subspace, and taking the Pareto curve corresponding to the look subspace as the target Pareto curve. The method for determining the current optimum rendering parameter that satisfies the precomputation condition is as follows:

If the preset precomputation condition is energy consumption precomputation, then searching the target Pareto curve, finding the rendering parameter that satisfies energy precomputation and has minimum error as the optimum rendering parameter;

If the preset precomputation condition is error precomputation, then searching the target Pareto curve, finding the rendering parameter that satisfies the error precomputation and has minimum energy consumption as the optimum rendering parameters.

After the optimum rendering parameter is obtained, within the preset transition time, interpolation of the current obtained optimum rendering parameter and interpolation of the optimum rendering parameter used in the real-time rendering process that is different from the current optimum rendering parameter but is closest to the current optimum rendering parameter in timing are performed to obtain the final rendering parameter to be used for real-time rendering.

Performing the interpolation in accordance with the formula as follows:

$$s_{optimal} = \left[\left(1 - \frac{t}{T}\right)s_{old} + \frac{t}{T}s_{new}\right],$$

Where, $s_{optimal}$ is the final rendering parameter, $s_{old}$ is the optimum rendering parameter used in real-time rendering process that is different from the current optimum rendering parameter but is closest in timing to the current optimum parameter, $s_{new}$, is the optimum rendering parameter currently obtained; t is the time of rendering when using the currently obtained optimum rendering parameter to render, T is the preset transition time, and the square brackets mean round down.

In the present invention, interpolation of optimum rendering parameters is performed to avoid too high fluctuation of rendering parameters, so as to ensure the continuity of the rendering result, and reduce the image jitter due to rendering parameter change.

In respect of the current 3D scene to be rendered, in the present invention, step (1) can be done first, i.e., the whole rendering process is divided into two processes: precomputation and real-time rendering, octree built by precomputation is built for use for real-time rendering to effectively improve rendering efficiency.

Unless otherwise specified, the error measuring method used in the present invention is sense-based SSIM, and the energy-consumption data are obtained by the API provided by the NVML library.

Comparing to the prior art, the benefits of the present invention are as follow:

Wide scope of application, not limited to a certain specific App, the rendering method of the present invention can be applied to OpenGL rendering frame and UnrealEngine 4 commercial game engine, and can be promoted to other different platforms, such as desktop PC and mobile device;

It not only saves a great deal of energy, but also ensures the quality of rendering result and extends the battery life. With the data generated from precomputation, the rendering program can quickly find the optimum rendering setting matching the precomputation.

SPECIFIC IMPLEMENTATION OF THE EMBODIMENTS OF THE PRESENT INVENTION

Below is detailed description of the present invention in combination with specific embodiments.

The real-time rendering method based on energy consumption-error precomputation in this embodiment comprises the following steps:

(1) A plurality of position subspaces and look subspaces with spatial level relationship are obtained through adaptive subdivision of the space positions and look space of the camera browsable to the user in the 3D scene to be rendered, and the spatial level structure of the scene to be rendered is determined based on the spatial level relationship between the position subspaces and the look subspaces;

During the process of adaptive subdivision of the camera position space, for each position subspace obtained at the completion of each subdivision, obtaining the error and energy consumption of the camera for rendering the 3D scene using a plurality of sets of preset rendering parameters in each look subspace at each vertex of the bounding volume that bounds the position subspace, and Pareto curve of the corresponding vertex and look subspace is built based on the error and energy consumption;

Each set of rendering parameters comprises at least the value of one rendering variable that controls the real-time rendering quality. When the number of the rendering variables corresponding to the rendering parameter exceeds 1, a set of rendering parameters can be represented by vector. When obtaining the error and energy consumption when the camera renders the 3D scene to be rendered using a plurality of sets of preset rendering parameters in each look subspace at each vertex point of the bounding volume that bounds the position subspace, the image quality relationship corresponding to such a plurality of rendering parameters is fixed. The more the sets of rendering parameters are used, the more accurate the finally obtained rendering parameter will be, however, it will take much more time, therefore, it shall be set based on actual application needs.

In this embodiment, the energy corresponding to each set of rendering parameters is the energy required for rendering the scene to be rendered using that set of rendering parameters; the high-low quality relationship of the rendered images obtained from a plurality of sets of preset rendering parameters is known already, just directly selecting the set of rendering parameters of the highest rendering image quality as the top quality rendering parameters.

At the time of adaptive subdivision of the position space and look space of the camera browsable to user in the 3D scene to be rendered, subdividing the space position first to obtain corresponding position subspaces, then at each of the vertex point of the bounding volume that bounds the position subspace, subdividing the look space of the camera at the vertex browsable to user to obtain corresponding look subspaces.

In this embodiment, dividing the look space of the camera browsable to user at each vertex point to obtain corresponding look subspaces, when dividing, building a 3D rectangular coordinate system at the vertex point, then dividing based on the positive and negative directions of the coordinate axes in the 3D rectangular coordinate system.

In the process of adaptive subdivision of the position space and look space of the camera browsable to user in the 3D scene to be rendered, prior to each subdividing, in respect of the current position subspace to be subdivided, conducting operation as follows based on the Pareto curve at each of the vertex point of the bounding volume that bounds that position subspace:

(a) If both of the two Pareto curves in each look space corresponding to the two vertexes at all sides of the bounding volume that bounds the current position subspace satisfy the condition of convergence, then stopping subdividing of the position subspace; the condition of convergence means the energy consumption distance between the two Pareto curves is less than the energy threshold or the error distance is less than the distance threshold;

(b) Otherwise, continuing subdividing that position subspace.

In this embodiment, the maximum iteration times are 50, the energy consumption threshold is 0.5 W, and the error threshold is 0.005.

The definitions of the energy consumption distance and error distance between the two Pareto curves $P_{c_0}$, $P_{c_1}$ are as follow:

$$D_e(P_{c_0}, P_{c_1}) = d_e(P_{c_0}, P_{c_1}) + d_e(P_{c_1}, P_{c_0}),$$

$$D_p(P_{c_0}, P_{c_1}) = d_p(P_{c_0}, P_{c_1}) + d_p(P_{c_1}, P_{c_0}),$$

Where, $c_0$ and $c_1$ respectively represent the viewpoint information of the camera corresponding to Pareto curves $P_{c_0}$, $P_{c_1}$, $D_e(P_{c_0}, P_{c_1})$ is the error distance between Pareto curves $P_{c_0}$, $P_{c_1}$, $D_p(P_{c_0}, P_{c_1})$ is the energy consumption distance between Pareto curves $P_{c_0}$, $P_{c_1}$, $d_e(P_{c_1}, P_{c_0})$ is the error semi distance function from Pareto curve $P_{c_1}$ to Pareto curve $P_{c_0}$, $d_e(P_{c_0}, P_{c_1})$ is the error semi distance function from Pareto curve $P_{c_0}$ to Pareto curve $P_{c_1}$, $d_p(P_{c_1}, P_{c_0})$ is the energy consumption semi distance function from Pareto curve $P_{c_1}$ to Pareto curve $P_{c_0}$, $D_p(P_{c_0}, P_{c_1})$ is semi distance function of energy consumption from Pareto curve $P_{c_0}$ to $P_{c_1}$, Which are respectively calculated using the formulas below:

$$d_e(P_{c_0}, P_{c_1}) = \frac{1}{N}\Sigma_j^N d_e(s_{0j}, P_{c_1}) = \frac{1}{N}\Sigma_j^N |e_{s_{0j}} - e'_{s_{0j}}|,$$

$$d_p(P_{c_0}, P_{c_1}) = \frac{1}{N}\Sigma_j^N d_p(s_{0j}, P_{c_1}) = \frac{1}{N}\Sigma_j^N |p_{s_{0j}} - p'_{s_{0j}}|;$$

$$d_e(P_{c_1}, P_{c_0}) = \frac{1}{M}\Sigma_j^N d_e(s_{1j}, P_{c_0}) = \frac{1}{M}\Sigma_j^N |e_{s_{1j}} - e'_{s_{1j}}|,$$

$$d_p(P_{c_1}, P_{c_0}) = \frac{1}{M}\Sigma_j^N d_p(s_{1j}, P_{c_0}) = \frac{1}{M}\Sigma_j^N |p_{s_{1j}} - p'_{s_{1j}}|;$$

Where, $c_0$ and $c_1$ respectively represent the camera viewpoint information corresponding to Pareto curves $P_{c_0}$, $P_{c_1}$, the camera viewpoint information is determined by the current position and orientation of the camera; N is the number of the rendering parameters on Pareto curve $P_{c_0}$, $s_{0j}$ is parameter j on Pareto curve $P_{c_0}$, $e_{s_{0j}}$ is the error when the camera viewpoint information is $c_0$ and the rendering parameter is set to $s_{0j}$, $e_{s_{0j}}'$ is the error when the camera viewpoint information is $c_1$ and the rendering parameter is set to $s_{0j}$, $d_e(s_{0j}, P_{c_1})$ is the difference between the error when the camera viewpoint information is $c_0$ and the rendering parameter is set to $s_{0j}$ and the error when the camera viewpoint information is $c_1$ and the rendering parameter is set to $s_{0j}$, $p_{s_{0j}}$ is the energy consumption when the camera viewpoint information is $c_1$ and the rendering parameter is set to $s_{0j}$, $e_{s_{0j}}'$ is the energy consumption when the camera viewpoint information is $c_1$ and the rendering parameter is set to $s_{0j}$, $d_p(s_{0j}, P_{c_1})$ is the difference between the energy consumption when the camera viewpoint information is $c_1$ and the rendering parameter is set to $s_{0j}$ and the energy consumption when the camera viewpoint information is $c_0$ and the rendering parameter is set to $s_{0j}$;

M is the number of the rendering parameters on Pareto curve $P_{c_1}$, $s_{1j}$ is parameter j on Pareto curve $P_{c_1}$, $e_{s_{1j}}$ is the error when the camera viewpoint information is $c_1$ and the rendering parameter is set to $s_{1j}$, $e_{s_{1j}}'$ is the error when the camera viewpoint information is $c_0$ and the rendering parameter is set to $s_{1j}$, $d_e(s_{1j}, P_{c_0})$ is the difference between the error when the camera viewpoint information is $c_1$ and the rendering parameter is set to $s_{1j}$ and the error when the camera viewpoint information is $c_0$ and the rendering parameter is set to $s_{1j}$; $p_{s_{1j}}$ is the energy consumption when the camera viewpoint information is $c_1$ and the rendering parameter is set to $s_{1j}$, $p_{s_{1j}}'$ is the energy consumption when the camera viewpoint information is $c_0$ and the rendering parameter is set to $s_{1j}$, $d_p(s_{1j}, P_{c_0})$ is the difference between the energy consumption when the camera viewpoint information is $c_1$ and the rendering parameter is set to $s_{1j}$ and the energy consumption when the camera viewpoint information is $c_0$ and the rendering parameter is set to $s_{1j}$.

In respect of the position subspace obtained from each subdivision, the Pareto curve on each look subspace at each vertex point of the bounding volume that bounds the position subspace is calculated as follows:

If the vertex is the vertex of the bounding volume that bounds the position subspace obtained from subdividing the upper level, then it is not to be calculated;

If it is on the side on which the two vertexes of the side on which that vertex is located satisfy the condition of convergence on the bounding volume that bounds the position subspace obtained from subdividing the upper level, then select the Pareto curve of any of the two vertexes on that side as the Pareto curve of the vertex;

Otherwise the Pareto curve of the vertex is to be calculated.

In this embodiment, the Pareto curve of the vertex is calculated based on genetic algorithm: First, randomly initialize a plurality of rendering parameter vectors to build initial parameters set, then operate as follows through iteration until the maximum times of iteration is reached, and build Pareto curve per the rendering parameter vector in the parameters set obtained from the last iteration:

Propagate and mutate the rendering parameter vector in the initial parameters set to generate new rendering parameter vector to form candidate set;

For the combination u and u' of any two parameters in the candidate set, if it satisfies u ≺ u', then keep it, otherwise get rid of u', and end the iteration, and use the combination obtained from that iteration as initial set for next iteration, u ≺ u' means (e(c,u')≤e(c,u) or p(c,u')<p(c,u)) and (p(c,u')≤p(c,u) or e(c,u')<e(c,u)), where, c is the viewpoint information, e(c,s) means the error of rendering when the camera viewpoint information is c and the rendering parameter vector is s, p(c,s) is the energy consumption of rendering when the camera viewpoint information is c and the rendering parameter vector is s.

This embodiment uses octree to describe adaptive space subdivision to obtain a spatial level structure comprising position subspaces and looks subspaces with spatial level relationship, and records all Pareto curves.

In the octree, each node corresponds to each subspace obtained under corresponding subdivided level, the node information of each node comprises the Pareto curves of the camera respectively at each vertex of the corresponding subspace in six directions.

(2) Based on the current camera viewpoint information, searching and obtaining the target Pareto curve in the spatial level structure (i.e., the octree), and using the target Pareto curve to determine a set of rendering parameters satisfying the precomputation condition as optimum rendering parameters to render the 3D scene to be rendered;

Where, the current camera viewpoint information comprises the position and orientation of the camera, and the precomputation condition is energy consumption precomputation or error precomputation.

The method for searching and obtaining the target Pareto curve in the spatial level structure based on the current camera viewpoint information is as follows:

Searching the spatial level structure based on the current camera viewpoint information, obtaining the position subspace in which the camera position is and the vertex on the bounding volume that bounds the position subspace that is closest to that position, and determining the look subspace in which the current camera orientation is located from the look subspace of the closest vertex, and taking the Pareto curve corresponding to the look subspace as the target Pareto curve.

The method for determining the current optimum rendering parameter that satisfies the precomputation condition is as follows:

If the preset precomputation condition is energy consumption precomputation, then searching the target Pareto curve, find the rendering parameter that satisfies energy precomputation and has minimum error as the optimum rendering parameter;

If the preset precomputation condition is error precomputation, then searching the target Pareto curve, find the rendering parameter that satisfies the error precomputation and has minimum energy consumption as the optimum rendering parameters.

In this embodiment, in order to further ensure the continuity of the rendering result, after the optimum rendering parameter is obtained, within the preset transition time, interpolation of the current obtained optimum rendering parameter and interpolation of the optimum rendering parameter used in the real-time rendering process that is different from the current optimum rendering parameter but is closest to the current optimum rendering parameter in timing are performed to obtain the final rendering parameter to be used for real-time rendering. Perform the interpolation in accordance with the formula as follows:

$$s_{optimal} = \left[\left(1 - \frac{t}{T}\right)s_{old} + \frac{t}{T}s_{new}\right],$$

Where, $s_{optimal}$ is the final rendering parameter, $s_{old}$ is the optimum rendering parameter used in real-time rendering process that is different from the current optimum rendering parameter but is closest in timing to the current optimum rendering parameter, $s_{new}$, is the optimum rendering parameter currently obtained; t is the time of rendering when using the currently obtained optimum rendering parameter to render (i.e., the interval between the time when the optimum rendering parameter is obtained and the time of performing interpolation), T is the preset transition time (in this embodiment, T is 2 s), and the square brackets mean round down.

The simulated test results of rendering scene using the method of this embodiment and the prior art (including average energy consumption and mean error) are as shown in the table, where, the top image quality is that all parameters in the extended setting of Unreal Engine 4 are set to 3, the medium-high image quality is set to 2, the medium-low image quality is set to 1, the lowest image quality is set to 0, the optimum parameters are the result of dynamic selection of this invention. It can be seen that the method of the present invention can achieve good balance between error and energy consumption, for the rendering of the scene, using the optimum method takes an energy consumption of 7.87 W only, in top image quality, this saves 50.4% of energy consumption, while the error is less than the result under lowest image quality parameters by one order of magnitude.

TABLE 1

| | Optimum parameter | Top image quality | Medium-high image quality | Medium-low image quality | Lowest image quality |
|---|---|---|---|---|---|
| Average energy consumption (Watt) | 7.87 | 15.87 | 11.80 | 8.88 | 6.11 |
| Mean error (1-SSIM) | 0.018 | 0.000 | 0.013 | 0.046 | 0.151 |

The above description is one optimum embodiment of the present invention only, the scope of protection for the present invention is not limited to the above embodiment, all technical solutions that belong to the principle of the present invention fall within the scope of protection of the present invention. To a person of ordinary skill in this field in the industry, any improvement or perfection conducted under the principle of the invention shall also be deemed as falling within the scope of protection of the present invention.

The invention claimed is:

1. A real-time rendering method based on energy consumption-error precomputation, which is characterized in comprising the following steps:

(1) in a precomputation step, obtaining a plurality of position subspaces and look subspaces with spatial level relationship through adaptive subdivision of the space positions and look space of the camera browsable to the user in the 3D scene to be rendered, and determining the spatial level structure of the scene to be rendered based on the spatial level relationship between the position subspaces and the look subspaces;

during the process of adaptive subdivision of the camera position space, for each position subspace obtained at the completion of each subdivision, obtaining the error and energy consumption of the camera for rendering the 3D scene using a plurality of sets of preset rendering parameters in each look subspace at each vertex of the bounding volume that bounds the position subspace, and building a Pareto curve of the corresponding vertex and look subspace based on the error and energy consumption;

(2) a real-time rendering step, based on the current camera viewpoint information, searching and obtaining a target Pareto curve selected from the Pareto curves in the spatial level structure, and use the target Pareto curve to determine a set of rendering parameters satisfying the precomputation condition as optimum rendering parameters to render the 3D scene to be rendered;

wherein the viewpoint information comprises the position and orientation of the camera, and the precomputation condition is energy consumption precomputation or error precomputation.

2. The real-time rendering method based on energy consumption-error precomputation according to claim 1, which is characterized in that: the error corresponding to each set of rendering parameters is the difference between the image obtained from rendering the 3D scene to be rendered using that set of rendering parameters and the image obtained from rendering the 3D scene to be rendered using a set of top quality rendering parameters;

a quality relationship of the rendered images obtained from a plurality of sets of preset rendering parameters is known already.

3. The real-time rendering method based on energy consumption-error precomputation according to claim 1, which is characterized in that: at the time of adaptive subdivision of the position space and look space of the camera browsable to user in the 3D scene to be rendered, subdividing the space position first to obtain corresponding position subspaces, then at each of the vertex point of the bounding volume that bounds the position subspace, subdividing the look space of the camera at the vertex browsable to user to obtain corresponding look subspaces.

4. The real-time rendering method based on energy consumption-error precomputation according to claim 3, which is characterized in that: corresponding look subspaces are obtained by subdividing the look space of the camera browsable to user at each vertex point by direction.

5. The real-time rendering method based on energy consumption-error precomputation according to claim 1, which is characterized in that: in the process of adaptive subdivision of the position space and look space of the camera browsable to user in the 3D scene to be rendered, prior to each subdividing, in respect of the current position subspace to be subdivided, conducting operation as follows based on the Pareto curve at each of the vertex point of the bounding volume that bounds that position subspace:

(a) if both of the two Pareto curves in each look space corresponding to the two vertexes at all sides of the bounding volume that bounds the current position subspace satisfy the condition of convergence, then stopping subdividing of the position subspace; the condition of convergence means the energy consumption distance between the two Pareto curves is less than the energy threshold or the error distance is less than the distance threshold;

(b) otherwise, continuing subdividing that position subspace.

6. The real-time rendering method based on energy consumption-error precomputation according to claim 5, which is characterized in that: the definitions of the energy consumption distance and error distance between the two Pareto curves $P_{c_0}$, $P_{c_1}$ are as follow:

$$D_e(P_{c_0}, P_{c_1}) = d_e(P_{c_0}, P_{c_1}) + d_e(P_{c_1}, P_{c_0}),$$

$$D_p(P_{c_0}, P_{c_1}) = d_p(P_{c_0}, P_{c_1}) + d_p(P_{c_1}, P_{c_0}),$$

where, $c_0$ and $c_1$ respectively represent the viewpoint information of the camera corresponding to Pareto curves $P_{c_0}$, $P_{c_1}$, $D_e(P_{c_0}, P_{c_1})$ is the error distance between Pareto curves $P_{c_0}$, $P_{c_1}$, $D_p(P_{c_0}, P_{c_1})$ is the energy consumption distance between Pareto curves $P_{c_0}$, $P_{c_1}$, $d_e(P_{c_1}, P_{c_0})$ is the error semi distance function from Pareto curve $P_{c_1}$ to Pareto curve $P_{c_0}$, $d_e(P_{c_0}, P_{c_1})$ is the error semi distance function from Pareto curve $P_{c_0}$ to Pareto curve $P_{c_1}$, $d_p(P_{c_1}, P_{c_0})$ is the energy consumption semi distance function from Pareto curve $P_{c_1}$ to Pareto curve $P_{c_0}$, $D_p(P_{c_0}, P_{c_1})$ is semi distance function of energy consumption from Pareto curve $P_{c_0}$ to Pareto curve $P_{c_1}$, which are respectively calculated using the formulas below:

$$d_e(P_{c_0}, P_{c_1}) = \frac{1}{N}\Sigma_j^N d_e(s_{0j}, P_{c_1}) = \frac{1}{N}\Sigma_j^N |e_{s_{0j}} - e'_{s_{0j}}|,$$

$$d_p(P_{c_0}, P_{c_1}) = \frac{1}{N}\Sigma_j^N d_p(s_{0j}, P_{c_1}) = \frac{1}{N}\Sigma_j^N |p_{s_{0j}} - p'_{s_{0j}}|;$$

$$d_e(P_{c_1}, P_{c_0}) = \frac{1}{M}\Sigma_j^N d_e(s_{1j}, P_{c_0}) = \frac{1}{M}\Sigma_j^N |e_{s_{1j}} - e'_{s_{1j}}|,$$

$$d_p(P_{c_1}, P_{c_0}) = \frac{1}{M}\Sigma_j^N d_p(s_{1j}, P_{c_0}) = \frac{1}{M}\Sigma_j^N |p_{s_{1j}} - p'_{s_{1j}}|;$$

where, $c_0$ and $c_1$ respectively represent the camera viewpoint information corresponding to Pareto curves $P_{c_0}$, $P_{c_1}$, the camera viewpoint information is determined by the current position and orientation of the camera; N is the number of the rendering parameters on Pareto curve $P_{c_0}$, $s_{0j}$ is parameter j on Pareto curve $P_{c_0}$, $e_{s_{0j}}$ is the error when the camera viewpoint information is $c_0$ and the rendering parameter is set to $s_{0j}$, $e'_{s_{0j}}$ is the error when the camera viewpoint information is $c_1$ and the rendering parameter is set to $s_{0j}$, $d_e(s_{0j},P_{c_1})$ is the difference between the error when the camera viewpoint information is $c_0$ and the rendering parameter is set to $s_{0j}$ and the error when the camera viewpoint information is $c_1$ and the rendering parameter is set to $s_{0j}$; $p_{s_{0j}}$ is the energy consumption when the camera viewpoint information is $c_1$ and the rendering parameter is set to $s_{0j}$, $e_{s_{0j}}'$ is the energy consumption when the camera viewpoint information is $c_1$ and the rendering parameter is set to $s_{0j}$, $d_p$ $(s_{0j}, P_{c_1})$ is the difference between the energy consumption when the camera viewpoint information is $c_1$ and the rendering parameter is set to $s_{0j}$ and the energy consumption when the camera viewpoint information is $c_0$ and the rendering parameter is set to $s_{0j}$; M is the number of the rendering parameters on Pareto curve $P_{c_1}$, $s_{1j}$ is parameter j on Pareto curve $P_{c_1}$, $e_{s_{1j}}$ is the error when the camera viewpoint information is $c_1$ and the rendering parameter is set to $s_{1j}$, $e_{s_{1j}}'$ is the error when the camera viewpoint information is $c_0$ and the rendering parameter is set to $s_{1j}$, $d_e(s_{1j}, P_{c_0})$ is the difference between the error when the camera viewpoint information is $c_1$ and the rendering parameter is set to $s_{1j}$ and the error when the camera viewpoint information is $c_0$ and the rendering parameter is set to $s_{1j}$; $p_{s_{1j}}$ is the energy consumption when the camera viewpoint information is $c_1$ and the rendering parameter is set to $s_{1j}$; $p_{s_{1j}}'$ is the energy consumption when the camera viewpoint information is $c_0$ and the rendering parameter is set to $s_{1j}$, $d_p$ $(s_{1j}, P_{c_0})$ is the difference between the energy consumption when the camera viewpoint information is $c_1$ and the rendering parameter is set to $s_{1j}$ and the energy consumption when the camera viewpoint information is $c_0$ and the rendering parameter is set to $s_{1j}$.

7. The real-time rendering method based on energy consumption-error precomputation according claim 6, which is characterized in that: in respect of the position subspace obtained from each subdivision, the Pareto curve on each look subspace at each vertex point of the bounding volume that bounds the position subspace is calculated as follows:
   if the vertex is the vertex of the bounding volume of the bounded position subspace obtained from subdividing the upper level, then it is not to be calculated;
   if it is on the side on which the two vertexes of the side on which that vertex is located satisfy the condition of convergence on the bounding volume that bounds the position subspace obtained from subdividing the upper level, then select the Pareto curve of any of the two vertexes on that side as the Pareto curve of the vertex; otherwise, the Pareto curve of the vertex is to be calculated.

8. The real-time rendering method based on energy consumption-error precomputation according to claim 7, which is characterized in that: wherein calculating the Pareto curve of a vertex is based on a genetic algorithm, by first, randomly initializing a plurality of rendering parameter vectors to build initial parameters set, then operating as follows through iteration until the maximum times of iteration is reached, and building Pareto curve per the rendering parameter vector in the parameters set obtained from the last iteration:
   propagating and mutating the rendering parameter vector in the initial parameters set to generate new rendering parameter vector to form candidate set;
   for the combination u and u' of any two parameters in the candidate set, if it satisfies u≺u', then keep it, otherwise get rid of u', and end the iteration, and use the combination obtained from that iteration as initial set for next iteration,
   u≺u' means (e(c,u')≤e(c,u) or p(c,u')<p(c,u)) and (p(c,u')≤p(c,u) or e(c,u')<e(c,u)), where, c is the viewpoint information, e(c,s) means the error of rendering when the camera viewpoint information is c and the rendering parameter vector is s, p(c,s) is the energy consumption of rendering when the camera viewpoint information is c and the rendering parameter vector is s.

9. A real-time rendering method based on energy consumption-error precomputation according to claim 8, which is characterized in that: the method for searching and obtaining the target Pareto curve in the spatial level structure based on the current camera position and orientation is as follows:
   searching the spatial level structure based on the current camera viewpoint information, obtaining the position subspace in which the camera position is and the vertex on the bounding volume that bounds the position subspace that is closest to that position, and determining the look subspace in which the current camera orientation is located from the look subspace of the closest vertex, and taking the Pareto curve corresponding to the look subspace as the target Pareto curve.

10. The real-time rendering method based on energy consumption-error precomputation according to claim 9, which is characterized in that: the method for determining the current optimum rendering parameter that satisfies the precomputation condition is as follows:
   if the preset precomputation condition is energy consumption precomputation, then searching the target Pareto curve, finding the rendering parameter that satisfies energy precomputation and has minimum error as the optimum rendering parameter;
   if the preset precomputation condition is error precomputation, then searching the target Pareto curve, finding the rendering parameter that satisfies the error precomputation and has minimum energy consumption as the optimum rendering parameters.

11. The real-time rendering method based on energy consumption-error precomputation according to claim 10, which is characterized in that: after the optimum rendering parameter is obtained, within the preset transition time, interpolation of the current obtained optimum rendering parameter and interpolation of the optimum rendering parameter used in the real-time rendering process that is different from the current optimum rendering parameter but is closest to the current optimum rendering parameter in timing are performed to obtain the final rendering parameter to be used for real-time rendering.

12. The real-time rendering method based on energy consumption-error precomputation according to claim 11, which is characterized in that, performing the interpolation in accordance with the formula as follows:

$$s_{optimal} = \left[\left(1 - \frac{t}{T}\right)s_{old} + \frac{t}{T}s_{new}\right],$$

where, $s_{optimal}$ is the final rendering parameter, $s_{old}$ is the optimum rendering parameter used in real-time rendering process that is different from the current optimum rendering parameter but is closest in timing to the current optimum parameter, $s_{new}$ is the optimum rendering parameter currently obtained; t is the time of rendering when using the currently obtained optimum rendering parameter to render, T is the preset transition time, and the square brackets mean round down.

* * * * *